United States Patent [19]

Amin

[11] 3,982,036
[45] Sept. 21, 1976

[54] CALCIUM PHOSPHATE AND CALCIUMCHLOROPHOSPHATE COMPOSITIONS

[75] Inventor: Ashok Babubhai Amin, Trenton, N.J.

[73] Assignee: American Cyanamid Company, Stamford, Conn.

[22] Filed: Oct. 15, 1973

[21] Appl. No.: 406,735

Related U.S. Application Data

[60] Continuation of Ser. No. 170,938, Aug. 11, 1971, which is a division of Ser. No. 791,944, Jan. 17, 1969, Pat. No. 3,652,206.

[52] U.S. Cl. ............................... 426/471; 423/300; 423/320; 423/321 R; 426/807; 426/74; 159/48 R; 71/41
[51] Int. Cl.² .......................................... A23B 4/04
[58] Field of Search.... 423/307, 300, 301, 319–321; 71/37, 39–41, 44, 48, 53; 426/1, 2, 74, 220, 271, 381, 807, 471, 472, 271, 425, 431

[56] References Cited
UNITED STATES PATENTS

| | | | |
|---|---|---|---|
| 2,114,600 | 4/1938 | Larsson | 423/319 |
| 2,759,795 | 8/1956 | Archer | 423/307 |
| 2,987,376 | 6/1961 | Gloss | 423/321 |
| 3,011,891 | 12/1961 | Locuratolo | 426/381 |
| 3,107,145 | 10/1963 | Hinkle et al. | 423/311 |
| 3,141,734 | 7/1964 | Ittlinger | 423/321 |
| 3,142,534 | 7/1964 | Nickerson | 423/311 |
| 3,151,936 | 10/1964 | Hollingsworth et al. | 423/307 |
| 3,151,941 | 10/1964 | Hollingsworth et al. | 423/321 |
| 3,449,074 | 6/1969 | Shcertzer | 423/319 |
| 3,453,076 | 7/1969 | Long et al. | 423/320 |

Primary Examiner—Norman Yudkoff
Assistant Examiner—Hiram H. Bernstein
Attorney, Agent, or Firm—Robert J. Feltovic; H. G. Jackson

[57] ABSTRACT

Novel feed grade calcium phosphate compositions are provided which contain calcium chlorophosphate in varying amounts. This novel composition and other heretofore known varieties of feed grade calcium phosphates are prepared by low temperature drying steps (spray drying or crystallization-evaporation) of solutions or slurries which have been partially defluorinated to the extent that the solution P/F ratio is at least 30–35 but less than 100. The novel compositions described above have adequate levels of phosphorus availability to animals thereby permitting their usage as an animal feed supplement.

8 Claims, 5 Drawing Figures

CALCIUM PHOSPHATE AND CALCIUMCHLOROPHOSPHATE COMPOSITIONS

This is a continuation of application Ser. No. 170,938, filed Aug. 11, 1971, which is a division of Ser. No. 791,944 filed Jan. 17, 1969 which is now U.S. Pat. No. 3,652,206 (1972).

BACKGROUND OF THE INVENTION

Calcium phosphate is widely used as a feed supplement to animal diets in order to provide animals with required amounts of phosphorus. Unfortunately, the phosphate rock commonly used to prepare calcium phosphate can contain large quantities of fluorine, as much as 4 percent. The presence of this much fluorine in an animal feed is known to cause fluorosis in the animals and thus it must be removed at some stage during preparation of the calcium phosphate. To be acceptable as a "feed grade" calcium phosphate, the phosphorus to fluorine weight ratio (P/F) in the product must be 100 or greater, a standard hitherto accepted in the art.

A host of methods for producing defluorined calcium phosphate are known. Methods which produce volatile fluorine compounds are most undesirable because of the severe air pollution they can create. Other methods are not used commercially because of their relatively high cost in relation to an inexpensive product. A preferred defluorination process is inexpensive and ties up the fluorine in liquid or solid form for easy and safe disposal.

U.S. Pat. No. 3,151,936 teaches single step defluorination of acid solutions of phosphate rock by simply subjecting the solutions to thin-film drying. More specifically, phosphate rock is digested with phosphoric acid and a more volatile mineral acid such as HCl. The solution is then spray-dried at high temperatures to yield feed grade calcium phosphate containing less than 5 percent volatiles and preferably less than 2 percent volatiles. The gaseous effluent from the dryer is condensed, defluorinated, and then recycled for use in acidulating more rock.

The reference process, it is noted, is directed towards essentially total removal of fluorine during the drying step. To achieve this in feasible commercial equipment such as a spray drier, very high temperatures i.e. 400°F. or higher, are ordinarily required. Such high temperatures are known to cause pyrolysis of calcium phosphate to pyrophosphates and metaphosphates, a form wherein phosphorus is less available to animals, this not only diminishes product yield but also produces a contaminated product.

When total defluorination is achieved in the drying step, the acid condensate naturally contains large amounts of fluorine. Recirculation of this acid to the rock digestors, without intervening defluorination, is not feasible since fluorine would soon accumulate in the digestors to a point where satisfactory defluorination in the subsequent drying step would no longer be achievable.

A further disadvantage when total defluorination is achieved during drying is the danger of fouling the equipment with $SiO_2$ formed by the hydrolysis of $SiF_4$.

Applicant has now discovered novel methods which employ spray drying and crystallization techniques whereby calcium phosphate can be essentially totally defluorinated without the use of very high drying temperatures and all the aforementioned difficulties associated with such high temperatures.

Moreover, with applicant's process, condensed acid streams from the drying step can be conveniently recycled, without intervening defluorination, for use in acidulating rock.

Applicant, in the course of carrying out his process, further produces novel calcium phosphate compositions which contain varying amounts of calcium chlorophosphate but which, nevertheless, have an available phosphorus content comparable to commercially available feed grade calcium phosphates thereby making such compositions eminently useful as animal feed supplements.

These and other advantages of this invention will be apparent from the following disclosure.

SUMMARY OF THE INVENTION

Spray-Dried Product and Process

This invention relates to a process for preparing mixtures of calcium phosphate and calcium chlorophosphate having a P/F ratio of 100 or greater by employing a spray drying technique. More particularly, this invention envisions preparing such feed grade calcium phosphate compositions by spray-drying:

a. a solution comprising water, phosphoric acid, and a salt selected from the group consisting of calcium dichloride or calcium nitrate, said solution further characterized in having a solution P/F ratio of at least about 30 but less than 100 and a Ca/P mole ratio which ranges from greater than 0.5 to about 1.0. or b. a slurry comprising solution as defined in (a) and calcium sulfate solids, wherein the exit gas temperature from the spray dryer is maintained at about 200°F. to about 380°F., and recovering the solid product from the dryer.

In cases where the calcium and phosphate in the above described solution originate directly from acidulated phosphate rock, the solution may alternatively contain an acid selected from the group consisting of hydrochloric and nitric, the anion of said acid corresponding to the anion of the salt contained in the solution.

The solutions contemplated by this invention include those which are produced merely by mixing aqueous solutions of calcium dichloride or calcium nitrate with phosphoric acid as well as those which are prepared in situ by acidulating phosphate rock. For purposes of clarity, however, the invention is described primarily in terms of solutions prepared by acidulation of phosphate rock.

Solutions or slurries as described above can be prepared by known methods as will be further discussed hereinbelow. They can also be prepared by a novel method which comprises dissolving phosphate rock in sulfuric acid and either HCl or $HNO_3$, adding to the solution a soluble sodium or potassium salt, filtering to remove solids, cooling the filtrate to cause additional precipitation of solids, removing the insolubles, and then, if necessary to achieve the required mole ratio of Ca/P in solution, adding more $H_2SO_4$ to the filtrate to produce the slurry described above. If sufficient $H_2SO_4$ is added in the digestor to achieve the desired Ca/P mole ratio, addition of more $H_2SO_4$ is not required thereby eliminating formation of the slurry and yielding an acidic solution as described above. Preparation of the solution or slurry by said novel process will be discussed in greater detail hereinbelow.

Due to the comparatively high P/F ratio (i.e. low fluorine content) in the solution prior to drying, the gaseous effluent from the spray dryer will not contain undue amounts of fluorine. Hence this effluent can be condensed or otherwise converted to liquid form and recycled, without an intervening defluorination step, to the digestors for use in acidulating more rock. Any small accumulation of fluorine which might tend to occur would be eliminated in the defluorination steps to which the solution is subjected prior to spray drying in order to raise the P/F ratio to at least 30 before drying.

This invention also relates to the novel calcium phosphate compositions prepared by the aforementioned process. In particular, this composition comprises calcium phosphate and calcium chlorophosphate, said composition further characterized by a P/F ratio of 100 or greater.

The amount of calcium chlorophosphate which appears in product prepared by the process of this invention will depend upon the solution of Ca/P ratio in the solution or slurry fed to the spray dryer with higher ratio values favoring the formation of more calcium chlorophosphate in the product. For example, when the Ca/P ratio is only slightly higher than 0.5, the product will contain only small amounts (i.e. 1 percent) of calcium chlorophosphate; on the other hand, if the Ca/P ratio is 1.0, it is possible under certain drying conditions to produce substantially pure (i.e. 100 percent) calcium chlorophosphate. A Ca/P mole ratio of 0.59 in the solution fed to the spray dryer produces a product containing 25 percent calcium chlorophosphate, this product having a chloride content of 5 percent.

The inclusion in the mixture of major amounts of calcium chlorophosphate without adverse effect on the amount of phosphorus available to animals is most surprising since heretofore it had been believed that the phosphorus content of calcium chlorophosphate was unavailable to animals.

The discovery that calcium chlorophosphate is suitable for use as an animal feed supplement is also related to the comparatively low drying temperatures of the process of this invention. This is so because it was believed heretofore that as much chloride as possible had to be removed from the product. Moreover, it was appreciated that to remove such chloride, high drying temperatures were necessary with all the disadvantages of high temperature drying as already discussed. By eliminating the need for removal of chloride from the product and by providing a novel method of removal of fluorine from the product under mild process conditions, a convenient process is made available for producing a high quality animal feed supplement.

The term "calcium phosphate" as used herein can mean either monocalcium phosphate, dicalcium phosphate, or hydrated forms of the prior two phosphates, as well as mixtures of two or more of the aforementioned phosphates or hydrates thereof.

This invention further relates to a method for supplementing the phosphorus content in an animal's diet which comprsises administering to the animals by oral ingestion a biologically acceptable amount of the aforedescribed novel composition or substantially pure calcium chlorophosphate.

CRYSTALLIZATION PROCESS

This invention also relates to a process for preparing crystalline monocalcium phosphate and hydrated forms thereof having a P/F ratio of 100 or greater by the use of a solution evaporation technique. More particularly, this invention envisions preparing such feed grade monocalcium phosphate by feeding to a crystallizer or other suitable apparatus containing therein phosphoric acid:

a. a solution comprising water and a salt selected from the group consisting of calcium dichloride or calcium nitrate, and b. phosphoric acid The solution and phosphoric acid can be fed to the crystallizer either as separate streams or they may be combined into a single stream prior to entering the crystallizer. The feed to the crystallizer is further characterized in having a solution P/F ratio of at least about 35 and a Ca/P mole ratio of about 0.5, said P/F and Ca/P ratios being based solely on the P, F, and Ca contained in the solution and phosphoric acid fed to the crystallizer. The mixture in the crystallizer is then heated or otherwise treated to remove water and other volatiles whereby crystals of monocalcium phosphate or hydrated forms thereof are produced. When this process is operated continuously at equilibrium, crystallizer mother liquor is continuously withdrawn from the crystallizer along with the monocalcium phosphate crystals. This mother liquor is separated from the crystals and recycled to the crystallizer while the crystals themselves are recovered.

The solution described above may also contain an acid selected from the group consisting of hydrochloric or nitric, the anion of said acid corresponding to the anion of the salt in the solution. In the event the solution does contain such an acid, it is desirable to maintain the $P_2O_5$ content in the crystallizer slurry between 35 percent and 60 percent. In computing these $P_2O_5$ percentages, both soluble and insoluble $P_2O_5$ in the slurry is included. Maintenance of these $P_2O_5$ contents in the slurry permits the acid strength of the gaseous effluent stream from the crystallizer to be kept within limits which allow said stream to be recycled for use in acidulating additional phosphate rock as is discussed in greater detail hereinbelow.

A suitable acidic crystallizer feed solution can be prepared in the same manner as described heretofore for the feed to the spray dryer. Similarly, the gaseous effluent from the crystallizer can be condensed and recycled, without intervening defluorination, to the digestors for use in acidulating phosphate rock.

DESCRIPTION OF THE PREFERRED EMBODIMENTS

Before a solution or slurry can be spray dryed or evaporated to yield a feed grade product, it is usually necessary to remove at least a portion of the fluorine originally present in the solution in order to establish the required solution P/F ratio of at least 30 or 35. In the case where the solution is prepared in situ by acidulation of phosphate rock, it is always necessary to remove some of the fluorine originally present in the rock in order to establish the required solution P/F ratio of at least 30 or 35.

Such partially defluorinated solutions can be prepared by heretofore known techniques. For example, one known method is to treat the solution with hydrofluoric acid in order to achieve an optimum F/Al mole ratio in solution of about 14–16 which assures maximum precipitation of an aluminum fluorine complex whose probable formula is presented hereinbelow. Precipitation of this complex not only removes the fluorine added as hydrofluoric acid but also up to 90 percent of the fluorine originally present in the rock. U.S. Pat. No. 2,976,141 exemplifies the hydrofluoric acid technique. This technique by itself cannot produce solution P/F ratios of 100 or greater but will produce ratios of 30 or greater. The hydrofluoric acid technique, however, is not preferred due to the expense and highly corrosive effect of the acid.

It is also possible to partially defluorinate such solutions by addition of $SiO_2$ to the solution. The fluorine is then volatilized as $SiF_4$. This is not desirable, however, because of possible fouling of metal equipment and heat transfer surfaces with $SiO_2$ at subsequent stages in the defluorination process.

Figure 1:
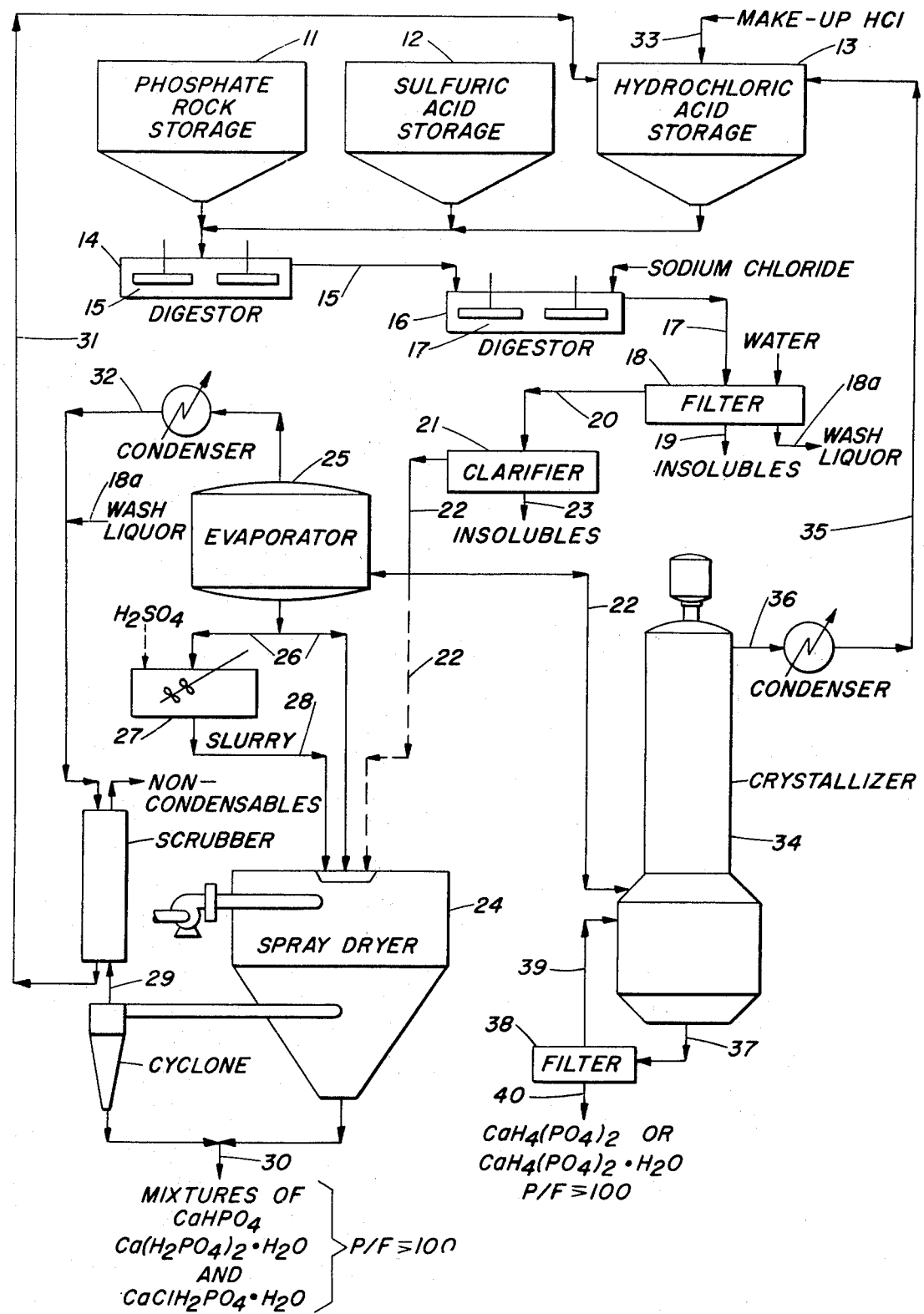
FIG. 1 is a schematic flowsheet showing a preferred embodiment of a spray-drying defluorination process and a crystallization process in accordance with the process of this invention.

A preferred process which incorporates a novel partial defluorination process prior to the spray drying and crystallization steps is presented schematically in FIG. 1. The preparation of solution suitable for spray drying or evaporation is essentially the same. Referring to FIG. 1, phosphate rock 11, aqueous sulfuric acid 12, and aqueous hydrochloric acid 13 are fed to a first digestor 14 wherein the rock is digested to yield a slurry 15 comprising (a) a solution of water, hydrochloric acid, calcium chloride, phosphoric acid, and soluble fluorine present as a variety of soluble fluorine containing compounds, and (b) a solid portion made up of calcium sulfate, a variety of insolubles from the rock such as $SiO_2$, and an aluminum fluorine complex having the probable formula:

$CaSO_4 \cdot CaF_2 \cdot AlF_3 \cdot 1.5\ CaSiF_6 \cdot 12\ H_2O$

Sufficient total acidity must be provided by the sulfuric and hydrochloric acid to dissolve the phosphate rock. Preferably a 20 to 30 percent excess of total acidity is used. The rock itself can be any commercial phosphate rock which is essentially fluorapatite such as Florida, North Carolina, or Moroccan rocks, also western phosphate rocks and igneous phosphates such as Quebec and Kola rock. The P/F ratio in most rocks is approximately 3.5. Of course, nitric acid can be used in place of the hydrochloric acid but hydrochloric acid is highly preferred due to its low cost and availability.

The ratio of hydrochloric to sulfuric acid employed in digestor 14 depends upon the nature of the product which is to be made. The function of the $H_2SO_4$ is to remove sufficient calcium from solution as calcium sulfate to establish the desired mole ratio of Ca to P in solution. If monocalcium phosphate crystals are to be prepared in the crystallization process, it is desirable to use enough $H_2SO_4$ to establish a Ca/P mole ration in solution of 0.4–0.5. If the spray drying route is to be followed to prepare a mixture of calcium phosphate and calcium chlorophosphate, sufficient $H_2SO_4$ should be used to establish a Ca/P mole ratio in solution of > 0.5–1.0. However, since the feed to the spray dryer may be either a solution or a slurry, there are several possible stages in the process where the $H_2SO_4$ can be conveniently added. For example, if a solution is to be spray dried, all of the required $H_2SO_4$ is added during the initial digestion of the rock. However, where flexibility in the phosphorus content of the product emerging from the spray drier is desired, it becomes convenient to add only a portion of the stoichiometric amount of $H_2SO_4$ required in the initial digestion step, adding the rest of it to the solution immediately prior to spray drying. In this case, calcium sulfate appears in the product as diluent. It can be seen that by varying the amount of the $H_2SO_4$ added to the solution immediately prior to spray drying, the percentage of phosphorus in the product can be varied by the appearance of more or less calcium sulfate diluent in the product.

There will be some formation of the aforementioned insoluble aluminum fluorine complex in digestor 14 causing removal of about 35 to 50% of the fluorine originally present in the rock. As a result, the P/F ratio in the solution portion of slurry 15 is usually about 7 to 10. The amount of fluorine removed as complex fluoride depends somewhat on the $Al^{+++}$ ion concentration in the solution. Excessive amounts of $Al^{+++}$ ions in the solution tend to reduce the formation of complex fluoride crystals. However, in all cases, sufficient fluorine can be complexed to produce the required solution P/F ratio in the feed to the spray dryer or crystallizer.

Slurry 15 is transferred to a second digestor 16. A water soluble sodium or potassium salt such as sodium chloride, sodium carbonate, sodium nitrate, potassium chloride, potassium nitrate, or such is added to slurry 15 in digestor 16 whereupon the salt reacts with the soluble fluorine to form the compound $Na_2SiF_6$ or $K_2SiF_6$, which then precipitates from solution removing additional fluorine. The salt is usually added in at least the stoichiometric amount required for reaction with the available fluorine. The precipitation of $Na_2SiF_6$ or $K_2SiF_6$ will usually remove an additional 10 to 25 percent of the fluorine originally present in the rock resulting in a P/F ratio of about 10 to 15 in the solution portion of slurry 17.

The sodium or potassium salt can be added to digestor 15 in lieu of digestor 16. It is preferred, however, that it be added at a point subsequent to precipitation of the aluminum fluorine complex since it appears that the more aluminum which exists in solution when the salt is added, the less $Na_2SiF_6$ or $K_2SiF_6$ which is formed. Therefore, by not adding salt until digestor 16, at which point a large portion of aluminum has been removed from solution, a somewhat larger crop of Na$_2$SiF$_6$ or K$_2$SiF$_6$ is obtainable, resulting in more efficient defluorination.

Slurry 17 is filtered 18 to remove the various insolubles 19 previously discussed. The filter cake is then advantageously washed with water to produce wash liquor 18a which is utilized at a later point in the spray-drying process. Filtrate 20 is transferred to clarifier 21 where it is cooled to further precipitate insolubles. Filtrate 20 is ordinarily cooled to a temperature of 10° to 30°F. Solution 22 is separated from insolubles 23. The clarification step can just as conveniently be performed prior to filtration step 18. Clarification will remove about 15 to 25 percent more of the fluorine originally present in the rock due to additional precipitation of the aluminum fluorine complex and Na$_2$SiF$_6$. Consequently, the P/F ratio in solution 22 will usually be at least about 35, a sufficiently high value to permit solution 22 to be spray dried or crystallized in accordance with the processes of this invention provided the proper Ca/P mole ratio exists in solution 22.

At this point it becomes convenient to separately discuss subsequent processing of solution 22 depending on whether it is to be crystallized or spray dried.

SPRAY DRYING

Solution 22 can be fed directly to spray dryer 24 (as shown by the dotted line in FIG. 1) provided sufficient H$_2$SO$_4$ was previously added in digestor 15 to establish a Ca/P mole ratio of > 0.5 to 1.0 in solution 22. However, if solution 22 is to be spray dried, it is advantageously preconcentrated in evaporator 25, either at ambient pressure or under vacuum to produce concentrated solution 26 which can then be fed directly to dryer 24 as shown in FIG. 1. On the other hand, if the election has been made to dilute the product with calcium sulfate as heretofore discussed, concentrated solution 26 will not contain the required Ca/P mole ratio since not all of the H$_2$SO$_4$ required to establish this ratio was added in digestor 15. In this event, solution 26 is transferred to mixing vessel 27 where the remainder of the H$_2$SO$_4$ required to establish a Ca/P mole ratio in solution of > 0.5 to 1.0 is added to solution 26 to produce slurry 28 containing calcium sulfate solids. Slurry 28 is then fed to spray dryer 24.

If the solution Ca/P mole ratio exceeds 1.0 it becomes difficult to remove the chlorine in the spray drying step unless very high temperatures are used. If the Ca/P ratio is below 0.5 the dried product will be undesirably contaminated with phosphoric acid and furthermore will be substantially free from calcium chlorophosphate.

The spray dryer conditions are controlled by maintaining the temperature of the gaseous effluent 29 from the dryer at prescribed temperatures within a range of 200°F. to 380°F. with preferred exit gas temperature being 200°F. to 350°F. These relatively low temperatures minimize degradation of the calcium phosphates to undesirable metaphosphates and pyrocompounds and, furthermore, prevent formation of compounds such as SiO$_2$ which can foul metallic equipment.

Figure 2:
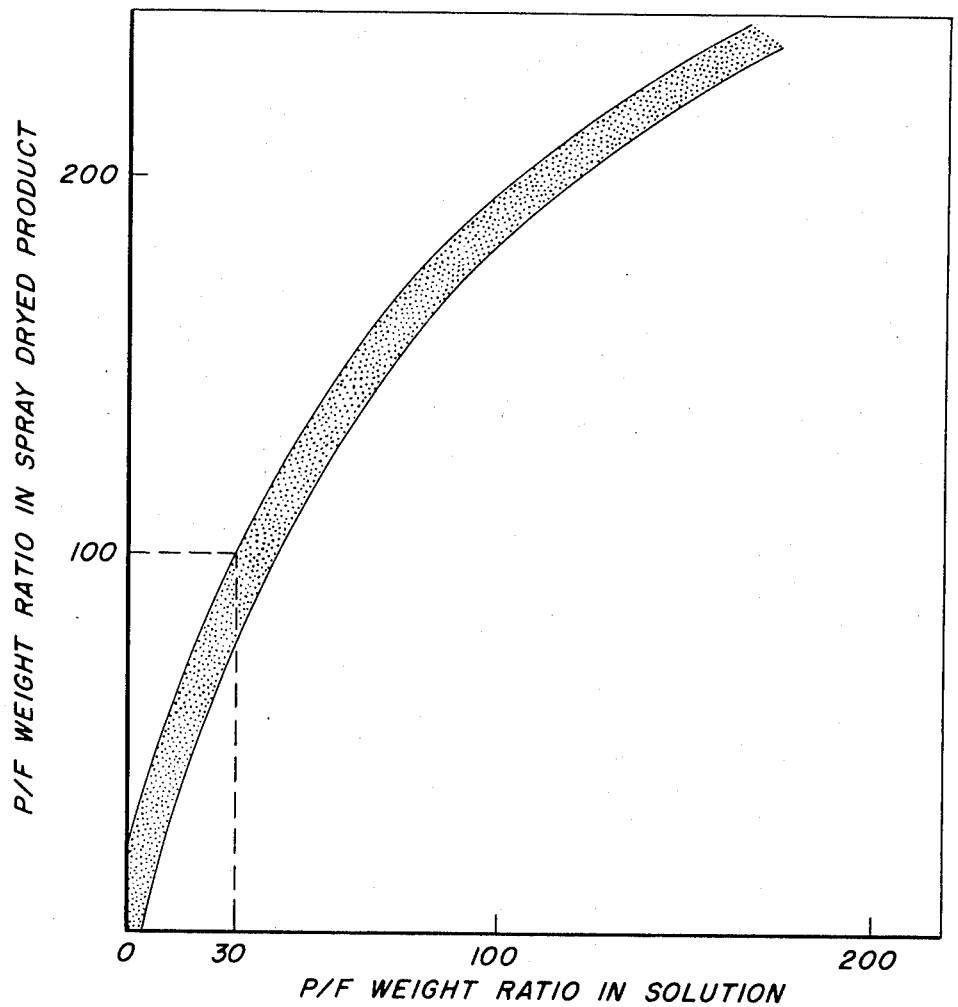
FIG. 2 is a plot of P/F ratio in the spray dried product vs. the spray dryer and is provided to indicate the criticality of the P/F ratio in the solution or slurry being at least about 30.

FIG. 2 clearly demonstrates that it is essential that the solution P/F ratio in either the solution or slurry fed to the spray dryer be at least 30 or higher if a dryed product having a P/F ratio of 100 or more is to be obtained. FIG. 1 was prepared using a variety of data points obtained at various dryer exit gas temperatures between 200°–380°F. The thickness of the plot reflects the slight variations observed with widely varying exit gas temperatures. However it is apparent that a solution P/F ratio of 30 or higher will produce a spray dried product having a P/F ratio of 100 or more under all the process conditions of this invention.

Figure 3:
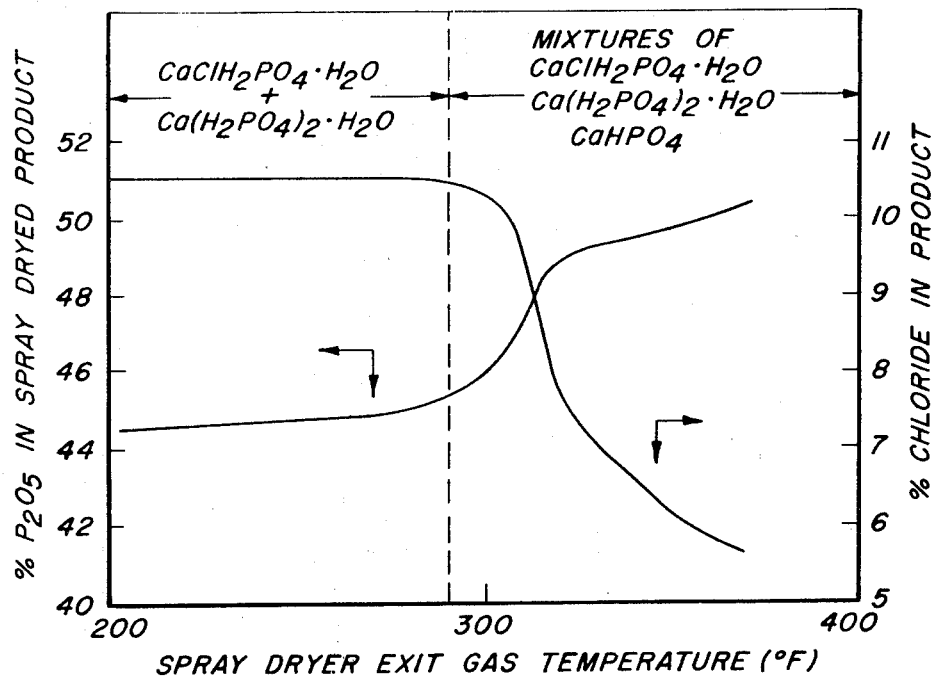
FIG. 3 is a plot of the $P_2O_5$ and chloride analyses of the spray dryed product vs. the exit gas temperature of the spray dryer and is provided to indicate the flexibility of product composition which is obtained by varying the exit temperature with the proscribed limits of this invention.

The composition of the dry product 30 produced will depend primarily on the particular value of the Ca/P mole ratio in the solution dried and the temperature of dryer exit gas 29. FIG. 3 shows the effect of exit gas temperature upon composition of the dry product for a Ca/P solution mole ratio of about 0.8 and solution feed rates to the dryer of 100 to 200 ml./min. At temperatures between 200°–300°F., the composition of the product remained fairly constant, the product containing about 60percent monocalcium phosphate monohydrate and 40 percent calcium chlorophosphate. At temperatures between 300°–380°F., the amount of P$_2$O$_5$ in the product rises sharply while the amount of chlorine drops sharply. The product produced in the region between 300°–380°F. is a mixture of dicalcium phosphate, monocalcium phosphate, and calcium chlorophosphate with the product formed at 360°F. containing 6.66percent, 59.0percent and 32.15percent, respectively, of each ingredient. Curves similar to FIG. 3 can, of course, be readily constructed for Ca/P mole ratios other than 0.8 in order to arrive at proper conditions for making a product of any desired composition.

Calcium chlorophosphate can be prepared in high purity using a Ca/P mole ratio in solution of 1.0 and exit gas temperatures of 200°–300°F. Monocalcium phosphate can be prepared in high purity using a Ca/P mole ratio in solution approximating 0.5 and higher exit gas temperatures (i.e. 350°–380°F.). Dicalcium phosphate is difficult to make in high purity under any conditions and this particular phosphate will usually be made in a mixture with monocalcium phosphate and/or calcium chlorophosphate. It is preferable to leave some chloride in the product mixture to avoid the use of the high drying temperatures required to remove chloride.

Referring to FIG. 1, gas stream 29 can be condensed to yield an aqueous stream of hydrochloric acid and soluble fluorine. The amount of acid in stream 29 will, of course, depend on the nature of the product to be made. Obviously, products containing more calcium chlorophosphate will reduce the amount of acid in stream 29. However, once the desired product composition is known, the acid content is readily computable. The fluorine content in stream 29 will be quite small, usually amounting to about 0.01 to 0.1 percent.

Since gas stream 29 contains non-condensables as well, it is advantageous to convert the water soluble condensable fraction of stream 29 to an aqueous HCl solution 31 for recycle by contacting stream 29 with a mixture of the condensed gaseous effluent 32 of evaporator 25 and wash liquor 18a from filtration step 18. Stream 31 can then be recycled to digestor 15 for use in acidulating rock or to reservoir 13. Since some hydrochloric acid will usually be consumed as product 30, it will be necessary in a continuous process to add make-up hydrochloric acid 33 from time to time to the system.

The mixtures of calcium phosphate and calcium chlorophosphate prepared by the spray-drying process of this invention have a level of phosphorus availability to animals which is comparable to commercially available feed grade calcium phosphates. This property, coupled with the acceptable P/F ratio, makes these mixtures suitable for use in supplementing the phosphorus requirements of a variety of animals including commercial livestock such as cattle, pigs, and poultry. The mixture is typically admixed with the diet fed to the animals in biologically acceptable amounts, said amounts being well established in the art.

It must be understood that for purposes of clarity a particular processing sequence was presented in FIG. 1. It is not intended that the processes of FIG. 1 represent inflexible process routes since it is readily apparent to those skilled in the art that a number of different arrangements and permutations of process steps could be used with acceptable results. Such varied arrangements and permutations, of course, fall within the scope of the claims appended hereto.

CRYSTALLIZATION

Referring again to FIG. 1, solution 22 is fed directly to crystallizer 34, the crystallizer containing therein phosphoric acid. The Ca/P solution mole ratio in solution 22 must not be greater than 0.5, otherwise there will be a buildup of calcium in crystallizer 34 with an attendant loss of acid available for recycle. A Ca/P mole ratio somewhat lower than 0.5, i.e. 0.4–0.5, will cause build-up of phosphoric acid in crystallizer 34. However, such a lower Ca/P ratio would be acceptable provided crystallizer 34 is purged from time to time to prevent phosphoric acid build-up.

The proper Ca/P mole ratio in solution 22 is preferably established by addition of the required amount of $H_2SO_4$ to digestor 15. It is most undesirable for solution 22 to contain solids such as, for example, calcium sulfate since it will make the product difficult to filter and will, additionally, defeat the objective of a pure high grade crystalline monocalcium phosphate.

The solution P/F ratio in solution 22 must be at least about 35 or greater. This is somewhat higher than the lower range of P/F ratio which is permissible in the spray dryer feed. However, the defluorination steps described above are suitable for partially defluorinating solution 22 to provide solution P/F ratios of 35 or greater.

Figure 4:
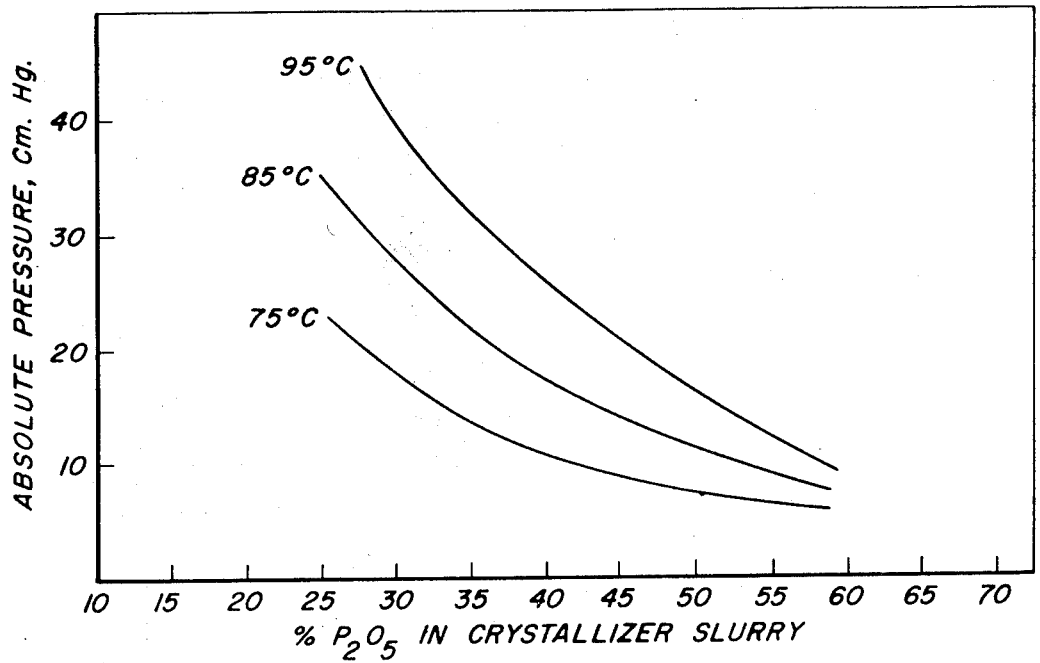
FIG. 4 is a plot of equilibrium data which defines the amount of $P_2O_5$ in the crystallizer slurry at various conditions of pressure and temperature within the crystallizer.

FIG. 4 presents equilibrium data which indicates the conditions of pressure and temperature within the crystallizer which are required to establish a given percentage of $P_2O_5$ in the crystallizer slurry.

Figure 5:
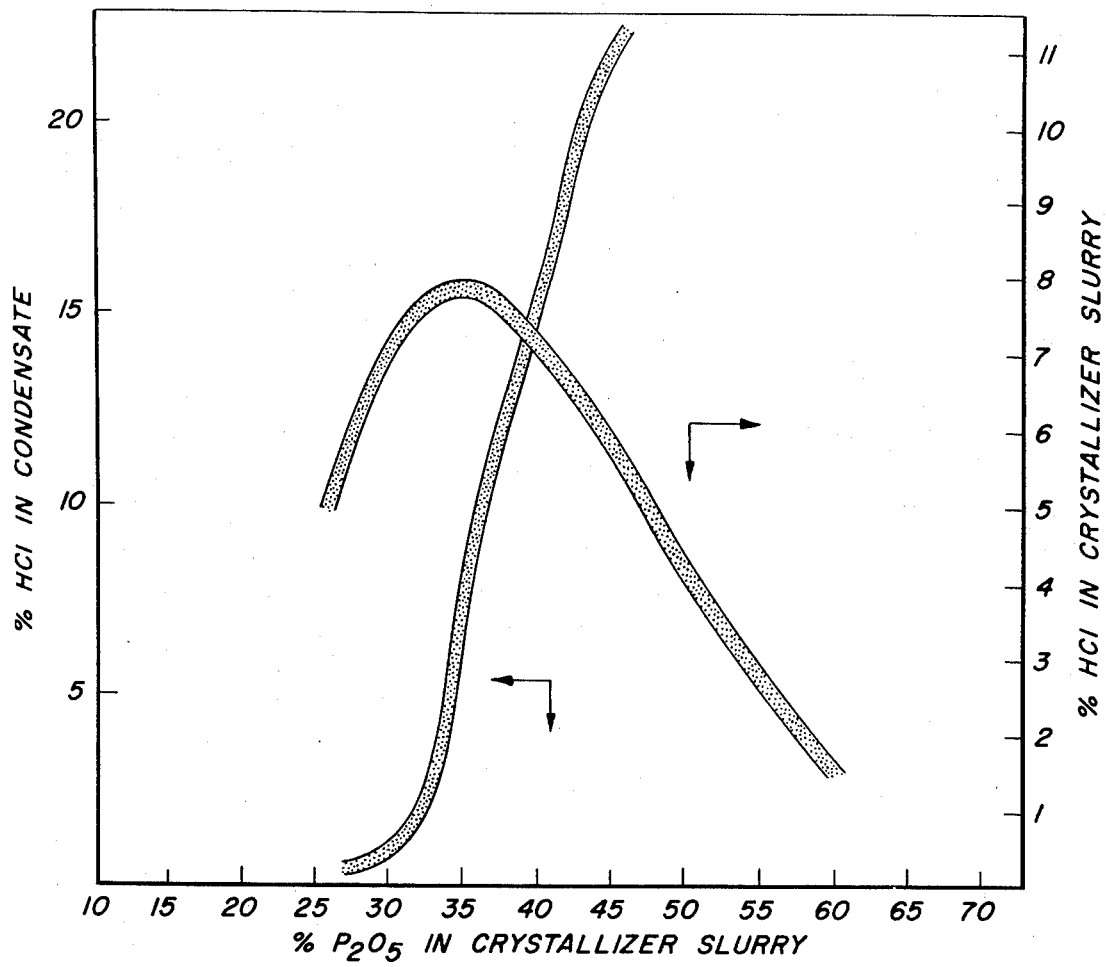
FIG. 5 is a plot of the amount of hydrochloric acid in the crystallizer slurry and in the recycle condensate vs. the amount of $P_2O_5$ in the crystallizer slurry.

FIG. 5 presents equilibrium data which indicates the amount of HCl in both the crystallizer slurry and in the condensed effluent gas stream 35 from crystallizer 34 as a function of the amount of $P_2O_5$ in the crystallizer slurry. Of particular interest, especially when a continuous process is to be used, is the acid strength of stream 35. This acid strength can be fixed at any of a variety of concentrations, by simply maintaining the required amount of $P_2O_5$ in the crystallizer slurry (as obtained from FIG. 5). This required amount of $P_2O_5$ is obtained by merely selecting the required pressure and temperature within the crystallizer (as obtained from FIG. 4).

The strength of the recovered hydrochloric acid stream 35 depends primarily upon the concentration of hydrochloric acid in feed solution 22. For example, if solution 22 contained 10 percent HCl and 40 percent water, the strength of recovered acid stream 35 would under equilibrium conditions be about 18–20 percent if minor loss of water as water of crystallization in monocalcium phosphate is taken into consideration. To obtain an acid strength of 18–20 percent in stream 35, the $P_2O_5$ content in the slurry of crystallizer 34 must be, according to FIG. 5, somewhere between 40 and 45 percent.

When the process is operated continuously under equilibrium conditions, the amount of $P_2O_5$ in the crystallizer slurry is preferably maintained at 35 to 60 percent, corresponding to an evaporator condensate 35 containing from about 5 to 25 percent HCl. If the HCl content of stream 35 is less than about 5 percent, the acid is too weak for use in the further acidulation of phosphate rock. If the HCl content of stream 35 exceeds about 25 percent, it is too concentrated to adequately solubilize the phosphate rock. Plots similar to FIGS. 4 and 5 can, of course, be readily prepared for a nitric acid system.

The gaseous effluent 36 from crystallizer 34 contains water, hydrochloric acid, and soluble compounds of fluorine in small amounts. Stream 36 typically contains 0.05 to 0.3 percent fluorine. Stream 36 is condensed to give an aqueous acid solution 35 which is then recycled for use in acidulating additional phosphate rock in digestor 15.

When the crystallization process is operated continuously at equilibrium, a stream 37 of mother liquor mixed with monocalcium phosphate crystals is continuously withdrawn from crystallizer 34. Stream 37 is filtered 38 or centrifuged to separate mother liquor 39 from the crystalline monocalcium phosphate product 40 whereupon mother liquor 39 is advantageously recycled to crystallizer 34. The mother liquor comprises water, phosphoric acid, calcium chloride (or calcium nitrate), monocalcium phosphate, hydrochloric acid (or nitric acid), and impurities derived from phosphate rock. The concentration of these ingredients depends, of course, on the crystallizer operating conditions such as temperature, pressure, feed solution composition, the rate of feed introduction into the crystallizer, recycle rate, and such.

The absolute pressure in the crystallizer can range from 1 cm. of Hg. to atmospheric pressure or higher. However, low pressures are preferred since this permits the use of lower operating temperatures.

The type of monocalcium phosphate crystallized, i.e. either anhydrous or the monohydrate, depends upon the temperature and $P_2O_5$ concentration of the mother liquor and is readily obtainable from a $CaO$-$P_2O_5$-$HCl$-$H_2O$ phase diagram.

The following examples are provided to further illustrate the invention.

EXAMPLE 1

Preparation of Partially Defluorinated Solutions for use as a Feedstock to the Spray-Dryer or Crystallizer a. by the process of this invention 50 parts of phosphate rock were digested with 62.4 parts of 21.5 percent aqueous HCl and 29.7 parts of 96 percent aqueous $H_2SO_4$. After a 2 hour digestion period, 2 parts of NaCl were added to the digestion mixture and digestion continued for an additional 2 hours. The slurry produced was filtered with the filtrate analysis being as follows:

$P_2O_5$: 16.64%
CaO: 8.57%
Cl: 16.66%
F: .28%

The Ca/P mole ratio of the filtrate was about 0.65 and the P/F ratio about 26, corresponding to removal of 86 percent of the fluorine initially present in the rock.

The filtrate was then cooled to a temperature of 10°C. whereupon some insolubles precipitated from solution. The resulting mixture was filtered to yield a filtrate containing 0.12 percent fluorine and having a P/F ratio of about 60 and a Ca/P mole ratio of 0.65. The P/F ratio of 60 indicated that 93 percent of the fluorine initially present in the rock was removed.

b. by a prior art process 230 parts of primary phosphate rock was digested with 458 parts of 24.4 percent aqueous HCl, 65.6 parts of 96 percent aqueous $H_2SO_4$, and 16.2 parts of 48.9 percent aqueous HF. The F/Al mole ratio in the digestion mixture was 14. After a 16 hour digestion period, the slurry was filtered. The filtrate analyzed as follows:

| | |
|---|---|
| $P_2O_5$: | 12.1% |
| CaO: | 10.4% |
| Cl: | 18.9% |
| F: | .087% |

The Ca/P mole ratio in the filtrate was 1.08 and the P/F ratio was 61, corresponding to removal of 93 percent of the fluorine initially present in the rock.

EXAMPLES 2 TO 5

Preparation of Feed Grade Calcium Phosphate by Spray-Drying of a Partially Defluorinated Solution The solution prepared in Example 1(a) was dried in a conventional spray dryer at various feed rates and dryer exit gas temperatures. Results are tabulated below and indicate that products having P/F ratios of 100 or greater were produced under all conditions studied.

| Example No. | Dryer Temp. (F.) Inlet gas | Dryer Temp. (F.) Exit gas | Feed Rate (ml./min.) | Product % $P_2O_5$ | Product % Cl | Product % F | P/F | Product Composition |
|---|---|---|---|---|---|---|---|---|
| 2 | 850 | 360 | 100 | 50.03 | 5.99 | 0.22 | 100 | $Ca(H_2PO_4)_2$ $CaClH_2PO_4.H_2O$ $CaHPO_4$ |
| 3 | 600 | 305 | 50 | 45.91 | 10.35 | 0.17 | 118 | $CaClH_2PO_4.H_2O$ $Ca(H_2PO_4)_2$ |
| 4 | 455 | 245 | 45 | 44.80 | 10.88 | 0.164 | 119 | $CaClH_2PO_4.H_2O$ $Ca(H_2PO_4)_2$ |
| 5 | 350 | 200 | 40 | 44.62 | 10.14 | 0.168 | 116 | $CaClH_2PO_4.H_2O$ $Ca(H_2PO_4)_2$ |

EXAMPLE 6

Preparation of Feed Grade Calcium Phosphate by Spray-Drying of a Partially Defluorinated Slurry 94.5 parts of the solution prepared in Example 1(b) was reacted with 4.6 parts of 96 percent aqueous $H_2SO_4$. The $CaSO_4.2H_2O$ thus formed was not removed from the solution. The mole ratio of Ca/P in the solution portion of the slurry was about 0.825. The slurry was then preconcentrated in a vacuum evaporator before spray drying. The gaseous effluent from this evaporator was condensed to produce a weak aqueous HCl solution which was subsequently used along with filter cake washings to absorb the HCl and other water soluble components of the gaseous effluent of the spray dryer so that the HCl might be recycled for use in acidulating more rock.

The concentrated slurry was then spray dried in conventional equipment with the temperature of the dryer exit gases being maintained at 360°F. The slurry feed rate to the dryer was about 150 ml./min. The gaseous effluent from the dryer gas circulated through the evaporator condensate to recover the HCl as an aqueous solution. The product from the dryer analyzed as follows:

| | |
|---|---|
| $P_2O_5$: | 37.2% |
| F: | .134% |
| Cl: | 6.0% | corresponding to a P/F ratio of 121. The product was a mixture of $CaHPO_4$, $Ca(H_2PO_4)_2$, $CaClH_2PO_4$, and $CaSO_4$.

Recovery of HCl was 95%. The F/HCl weight ratio in the recovered HCl stream was 0.0023.

EXAMPLE 7

Preparation of Feed Grade Monocalcium Phosphate Crystals by Crystallization from a Partially Defluorinated Solution A partially defluorinated calcium nitrate-phosphoric acid solution was prepared by digesting phosphate rock with mixed nitric and sulfuric acids by a method similar to that of Example 1(a). The filtered solution analyzed:

| | |
|---|---|
| $P_2O_5$: | 16.5% |
| CaO: | 6.52% |
| $NO_3$: | 19.80% |
| F: | .199% |

The P/F ratio of the solution was about 36 indicating that 89 percent of the fluorine initially present in the rock was removed by the formation of the insoluble aluminum fluourine complex and $Na_2SiF_6$.

The solution was fed to a crystallizer containing a mother-liquor saturated with respect to $Ca(H_2PO_4)_2$ and having the following analysis:

| | |
|---|---|
| $P_2O_5$: | 56.16% |
| $NO_3$: | 5.08% |
| F: | .24% |

The crystallizer was operated at 125°C. and 6 cm. Hg. absolute pressure. The solution fed to the crystallizer had a Ca/P mole ratio of about 0.5. In the crystallizer the feed solution was converted into two phases: (1) a solid phase containing $Ca(H_2PO_4)_2$ and (2) a vapor phase containing $HNO_3$, $H_2O$ and small amount of fluorine as $SiF_4$ and/or HF. The vapor phase was condensed for recycle to the rock digestion system. Crystalline monocalcium phosphate was separated by filtration of the mother-liquor. The product analyzed as follows before washing:

| | |
|---|---|
| $P_2O_5$: | 55.2% |
| $NO_3$: | 3.96% |
| F: | .037% | corresponding to a P/F ratio of 650.

EXAMPLE 8

Preparation of Feed Grade Calcium Phosphate by Spray Drying an Acid Free-Partially Defluorinated Solution An aqueous solution of calcium dichloride was mixed with phosphoric acid of high fluorine content to produce a solution having a Ca/P mole ratio of 0.8 and a solution P/F ratio of about 20. The solution was treated with NaCl and chilled to produce a precipitate in accordance with the procedure of Example 1(a). The slurry was filtered yielding a filtrate having a Ca/P mole ratio of 0.8 and a P/F ratio of about 60. The solution was then fed to a conventional spray dryer at a rate of about 125 ml./min., with the exit gas temperature of the dryer being maintained at about 320°F. The dried product had a P/F ratio in excess of 100 and comprised a mixture of $CaHPO_4$, $CaClH_2PO_4 \cdot H_2O$, and $Ca(H_2PO_4)_2$.

EXAMPLE 9

Preparation of Feed Grade Monocalcium Phosphate Crystals by Crystallization from an Acid Free-Partially Defluorinated Solution Phosphoric acid of high fluorine content was treated with NaCl in accordance with the procedure of Example 1(a) to yield a defluorinated phosphoric acid having a P/F ratio of about 65. The phosphoric acid and an aqueous solution of calcium dichloride were separately fed to a crystallizer containing therein phosphoric acid. The Ca/P mole ratio in the feed to the crystallizer was about 0.5 and the P/F ratio about 65 (based on the Ca, P, and F in the two feed streams only). The crystallizer was operated at 125°C. and 6 cm. Hg. absolute pressure. Crystalline monocalcium phosphate was recovered from the crystallizer having a P/F ratio in excess of 100.

In any of the prior examples, hydrochloric and nitric acid can, of course, be used interchangeably.

I claim:

1. A process for preparing a mixture of calcium phosphate and calcium chlorophosphate having a P/F ratio of 100 or greater which comprises:
    spray-drying a solution comprising water, phosphoric acid, and calcium dichloride salt, the solution further characterized in having a solution P/F ratio of at least about 30 but less than 100 and a Ca/P mole ratio of which ranges from greater than 0.5 to about 1.0, the exit gas temperature of the spray dryer being from about 200°F. to about 380°F., and recovering the solid product therefrom.

2. The process of claim 1 wherein said solution further includes hydrochloric acid.

3. The process of claim 2 wherein the solution is prepared by the steps of:
    a. digesting phosphate rock with an aqueous solution of sulfuric acid and hydrochloric acid,
    b. contacting the solution with a water soluble sodium or potassium salt to form the compound $Na_2SiF_6$ or $K_2SiF_6$, respectively,
    c. collecting the filtrate,
    d. cooling the filtrate to cause further precipitation of insolubles and then separating the insolubles from the filtrate,
    e. adding additional sulfuric acid to the filtrate but only if necessary to adjust the Ca/P mole ratio in solution to from greater than 0.5 to about 1.0.

4. The process of claim 3 wherein the dryer exit gas temperature is from about 200°F to about 350°F and said solution is preconcentrated prior to being spray dried and further including the steps of condensing the water soluble fraction of the gaseous effluent from said spray dryer or otherwise forming an aqueous solution of said water soluble fraction, and then recycling said condensate or solution, without removal of fluorine, for use in acidulating phosphate rock.

5. A process for preparing a mixture of calcium phosphate and calcium chlorophosphate having a P/F ratio of 100 or greater which comprises:
    spray-drying a slurry comprising (a) solution comprising water, phosphoric acid, and calcium dichloride salt, the solution further characterized in having a solution P/F ratio of at least about 30 but less than 100 and a Ca/P mole ratio of which ranges from greater than 0.5 to about 1.0 and (b) calcium sulfate solids wherein the exit gas temperatures of the spray dryer are from about 200°F. to about 380°F., and recovering the solid product therefrom.

6. The process of claim 5 wherein the solution further includes hydrochloric acid.

7. The process of claim 6 wherein the slurry is prepared by the steps of:
    a. digesting phosphate rock with an aqueous solution of sulfuric acid and hydrochloric acid,
    b. contacting the solution prepared in (a) with a water soluble sodium or potassium salt to form the compound $Na_2SiF_6$ or $K_2SiF_6$, respectively,
    c. removing insolubles from the slurry of (b) and collecting the filtrate,
    d. cooling the filtrate to cause further precipitation of insolubles and then separating the insolubles from the filtrate,
    e. adding additional sulfuric acid to the filtrate but only if necessary to adjust the Ca/P mole ratio in solution to form greater than 0.5 to about 1.0.

8. The process of claim 7 wherein the dryer exit gas temperature is from about 200°F. to about 350°F. and the slurry is preconcentrated prior to being spray dried and further including the steps of condensing the water soluble fraction of the gaseous effluent from the spray dryer or otherwise forming an aqueous solution of the water soluble fraction, and then recycling the condensate or solution, without removal of fluorine, for use in acidulating phosphate rock.

* * * * *